United States Patent [19]
Holtey et al.

[11] 4,393,461
[45] Jul. 12, 1983

[54] COMMUNICATIONS SUBSYSTEM HAVING A SELF-LATCHING DATA MONITOR AND STORAGE DEVICE

[75] Inventors: Thomas O. Holtey, Newton; Steven S. Noyes, Boylston; Daniel G. Peters, Billerica, all of Mass.

[73] Assignee: Honeywell Information Systems Inc., Waltham, Mass.

[21] Appl. No.: 194,311

[22] Filed: Oct. 6, 1980

[51] Int. Cl.³ .............................................. G06F 3/05
[52] U.S. Cl. .............................. 364/900; 340/825.06; 179/175.2 C
[58] Field of Search ... 364/200 MS File, 900 MS File; 178/3; 179/18 ES, 2 DP, 175.2 C; 370/79, 85; 340/825.06, 825.07; 375/8, 36, 107

[56] References Cited

U.S. PATENT DOCUMENTS

| | | | |
|---|---|---|---|
| 3,348,209 | 10/1967 | Brooks | 364/900 |
| 4,125,872 | 11/1978 | Maxwell | 364/900 |
| 4,156,796 | 5/1979 | O'Neal et al. | 364/900 X |
| 4,156,907 | 5/1979 | Rawlings et al. | 364/200 |
| 4,168,532 | 9/1979 | Dempsey et al. | 364/900 |
| 4,254,462 | 3/1981 | Raymond et al. | 364/200 |

*Primary Examiner*—Eddie P. Chan
*Attorney, Agent, or Firm*—Nicholas Prasinos

[57] ABSTRACT

A communications subsystem having a microprocessor coupled to an address bus and a data bus includes a latching register also coupled to the address bus and the data bus. The latching register is responsive to signals from the data bus and address bus for storing bits representative of a direct connect mode, a clear to send mode, and a bit oriented or byte control protocol mode.

6 Claims, 4 Drawing Figures

- - - CONTROL

COMMUNICATIONS SUBSYSTEM HAVING A SELF-LATCHING DATA MONITOR AND STORAGE DEVICE

BACKGROUND OF THE INVENTION

1. Field of the Invention

This invention relates to data processing systems and more particularly to the recovering and storing of status signals used in data communications.

2. Description of the Prior Art

Highly flexible and cost effective communications subsystems have been provided for coupling data processing systems to communication channels, such as those associated with a publicly accessible (e.g., telephone) communications network. Such systems have been embodied in hardware/firmware architectures which respond to commands from a communication processor associated with a central processing unit and enter into either a receive mode, a transmit mode, or concurrent transmit/receive modes for transferring data messages between the communication processor and the communication channel. Data transfers occur under the control of a firmware system acting in concert with a microprocessor within the adapter to assemble and disassemble whole or partial data bytes of varying bit sizes. System architectures which have been used readily accommodate an expansion of capacity and exhibit dynamic flexibility.

Typical of such communications systems are the ones described in U.S. application Ser. No. 000,304 entitled, "Hardware for Extending Microprocessor Addressing Capacity," now abandoned, and U.S. application Ser. No. 053,110 entitled, "Communication Line Adapter for a Bit and Byte Synchronized Data Network," now abandoned.

However, these systems required an excessive number of microinstructive steps to control the direct connect clock control signals, the clear to send signals, and the protocol signals for each communication line coupled to the communications subsystem. This created excessive firmware overhead with a resulting reduction in communications subsystem throughput.

It should be understood that the references cited herein are those which the applicants are aware of, and are presented to acquaint the reader with the level of skill in the art, and may not be the closest reference to the invention. No representation is made that any search has been conducted by the applicants.

OBJECT OF THE INVENTION

It is a primary object of the invention to provide a communications subsystem with improved system performance.

It is another object of the invention to provide a communications subsystem with apparatus for decreasing the firmware overhead.

It is still another object of the invention to provide a central storage element capable of monitoring and dynamically controlling real time events as they occur in the communications subsystem.

It is yet another object of the invention to provide a central storage element capable of dynamically modifying the operation of other elements in the communications subsystem.

SUMMARY OF THE INVENTION

A communications subsystem includes a data bus and an address bus. Coupled to the address and data buses are a microprocessor, a number of Universal Synchronous Receiver Transmitters (USRTs), and a data monitoring latch. Coupled to the data bus are a number of Flexible Line Adapter Packages (FLAPs). The data monitoring latch is responsive to signals on the address and data buses indicative of a direct connect mode, a clear to send mode, and a bit oriented or byte control protocol mode of operation.

The loading of the data monitoring latch is controlled by a flip-flop output signal, selected address signals, and a first channel number bit signal.

The flip-flop is controlled by a number of timing signals and a microprocessor generated read/write cycle signal. The flip-flop may be controlled synchronously or asynchronously.

The data monitoring latch includes a number of registers selected by a second channel number bit signal, a paging strobe signal and the lease significant address bit signal.

The data monitoring latch registers store bits indicating the direct connect mode,, the clear to send mode and the protocol for each communication line. The second channel number bit identifies one of two communication lines. The paging strobe signal is generated by decoding a number of addresses and is used to select the register into which the bit identifying the protocol is stored.

The data monitoring latch is responsive to a selected data bus signal during the read cycle for storing the clear to send bit and during the write cycle for storing the protocol or direct connect bits. The flip-flop is controlled asynchronously for the read cycle and is reset asynchronously at the start of the write cycle and set synchronously at the end of the write cycle.

DESCRIPTION OF THE PREFERRED EMBODIMENT

Figure 1:
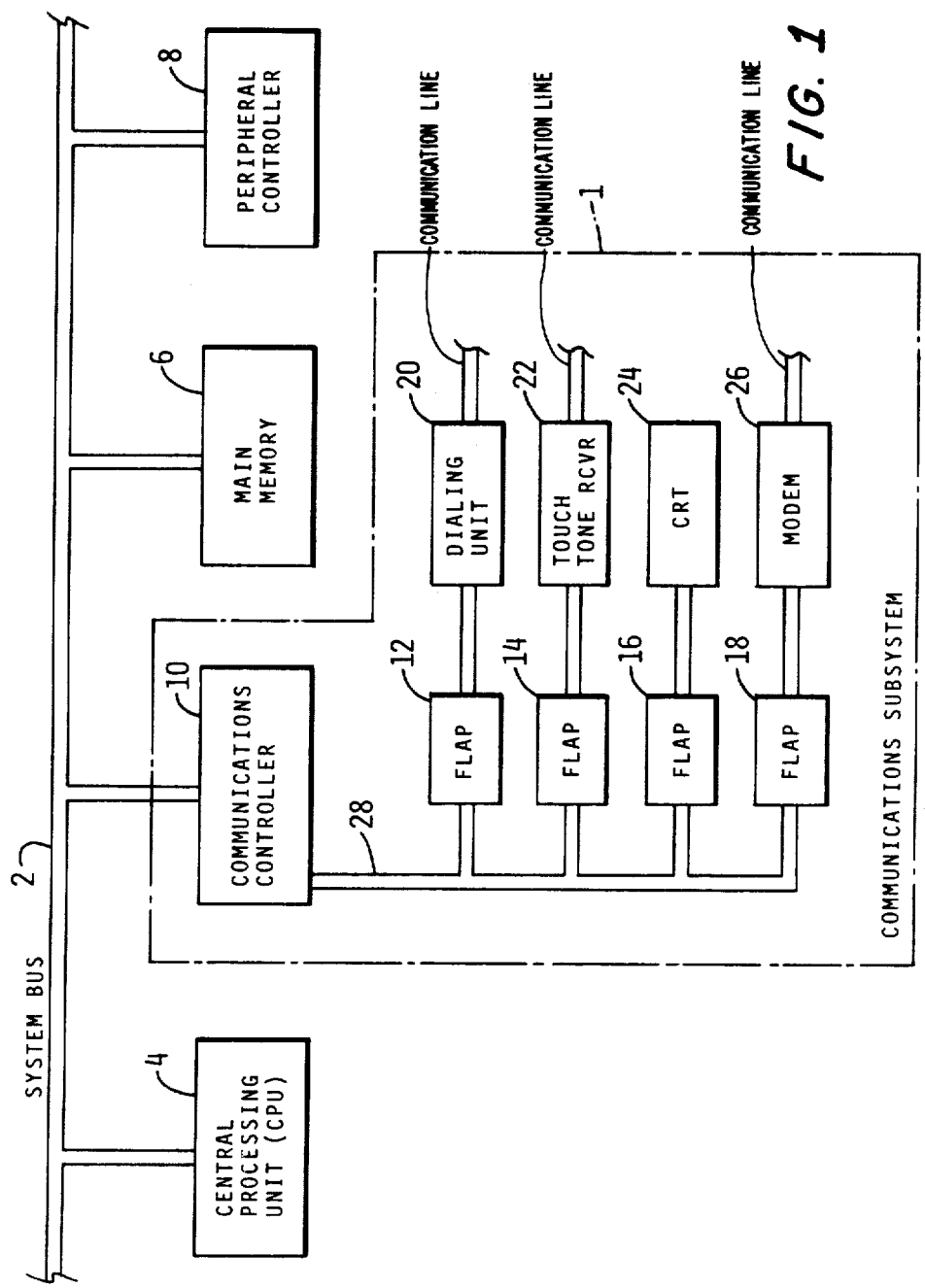
FIG. 1 is a block diagram of the overall system.

FIG. 1 is a block diagram of a typical system. It includes a central processor unit (CPU) 4, a main memory 6, a peripheral controller 8, and a communications controller 10, all coupled in common to a system bus 2. The communications subsystem 1 includes the communications controller 10 and a number of units coupled to the communications controller 10 by a bus 28. This includes a number of flexible line adapter packages (FLAPs) 12, 14, 16 and 18. Coupled to FLAP 12 typically, could be a dialing unit 20. Coupled to FLAP 14 typically, could be a touch-tone receiver 22. Coupled to FLAP 16 typically, could be a cathode ray tube (CRT) display 24. Coupled to FLAP 18 typically, could be a modem 26.

The communications subsystem 1 receives information from devices, typically the touch-tone receiver 22 and the modem 2, through FLAPS 14 and 18 respectively. The information is transferred over bus 28 to communications controller 10. The information is stored via system bus 2 in main memory 6.

The communications subsystem 1 sends information to devices, typically the dialing unit 20, the CRT 24 and the modem 26. The information is sent to FLAPs 12, 16 and 18 from main memory 6 via communications controller 10 and system bus 2.

The CPU 4 has overall control of the communications subsystem 1 execution and performance. The CPU 4 accomplishes this by transferring configuration and control information via system bus 2 for storage in the communications controller 10. This information includes channel control programs (CCP), communication control blocks (CCB), and line control tables (LCT).

Figure 2:
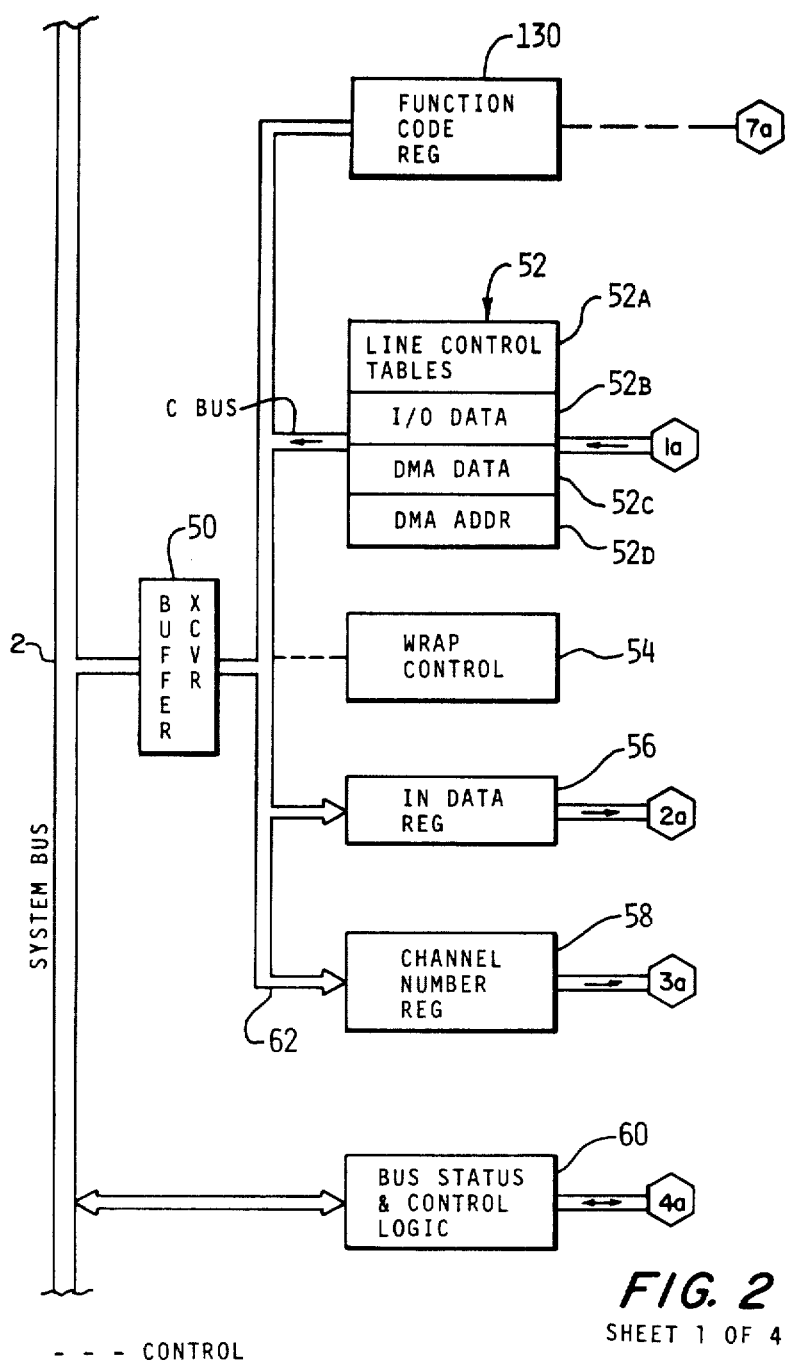
FIG. 2 is a block diagram of the communications subsystem. Sheets 1–3 of FIG. 2 are block diagrams of the communications controller 10.
Figure 2:
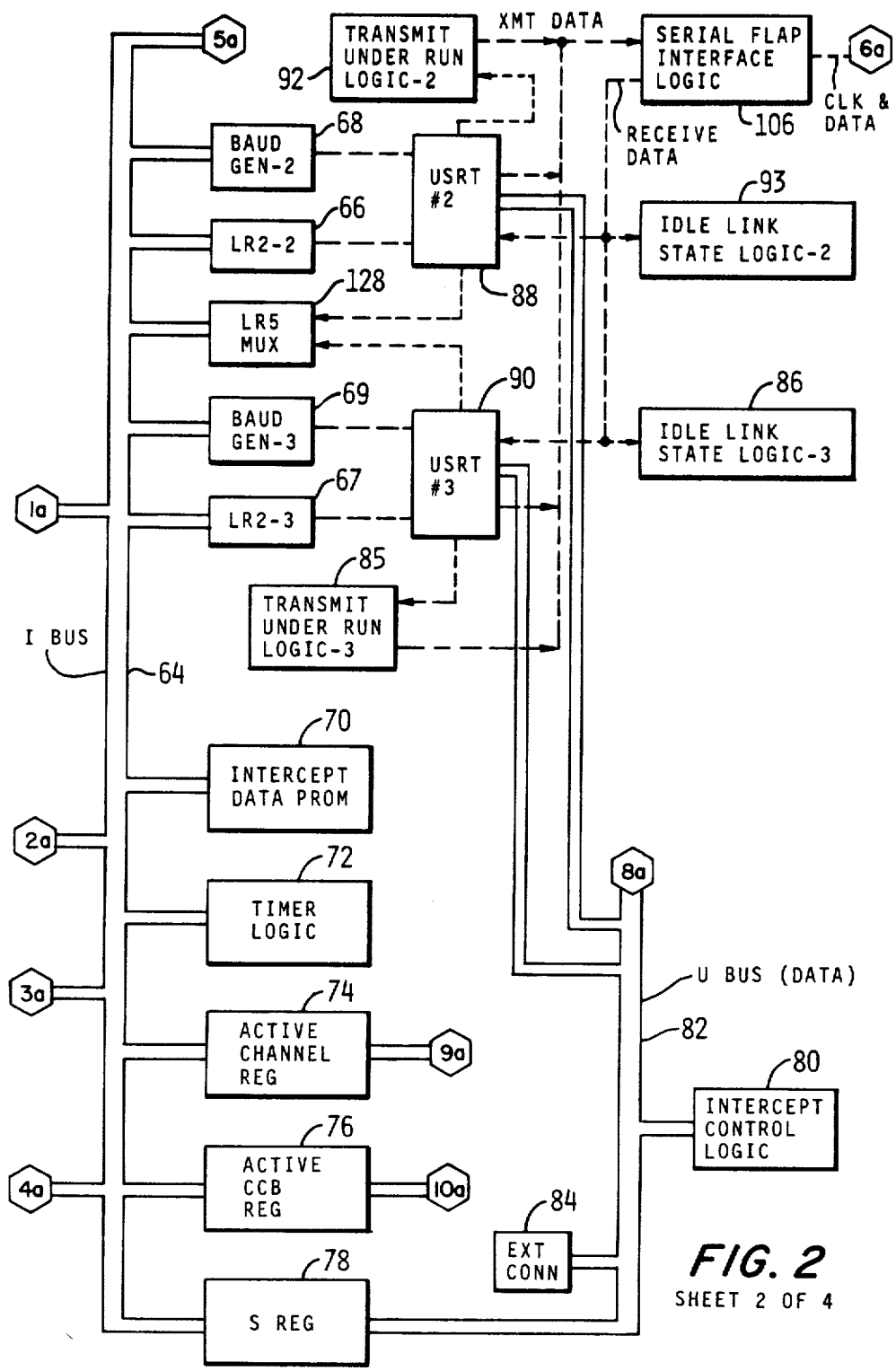
Figure 2:
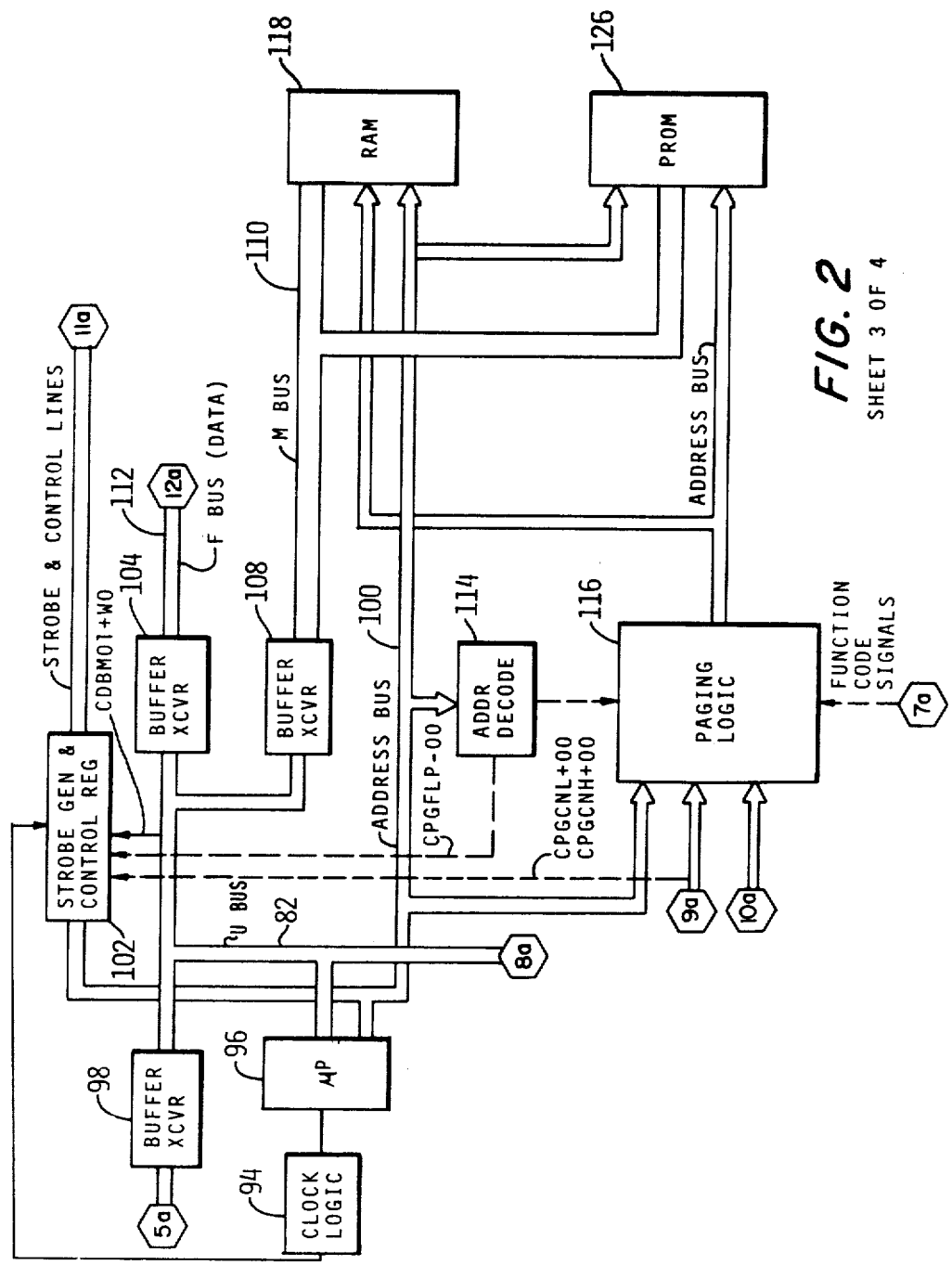
Figure 2:
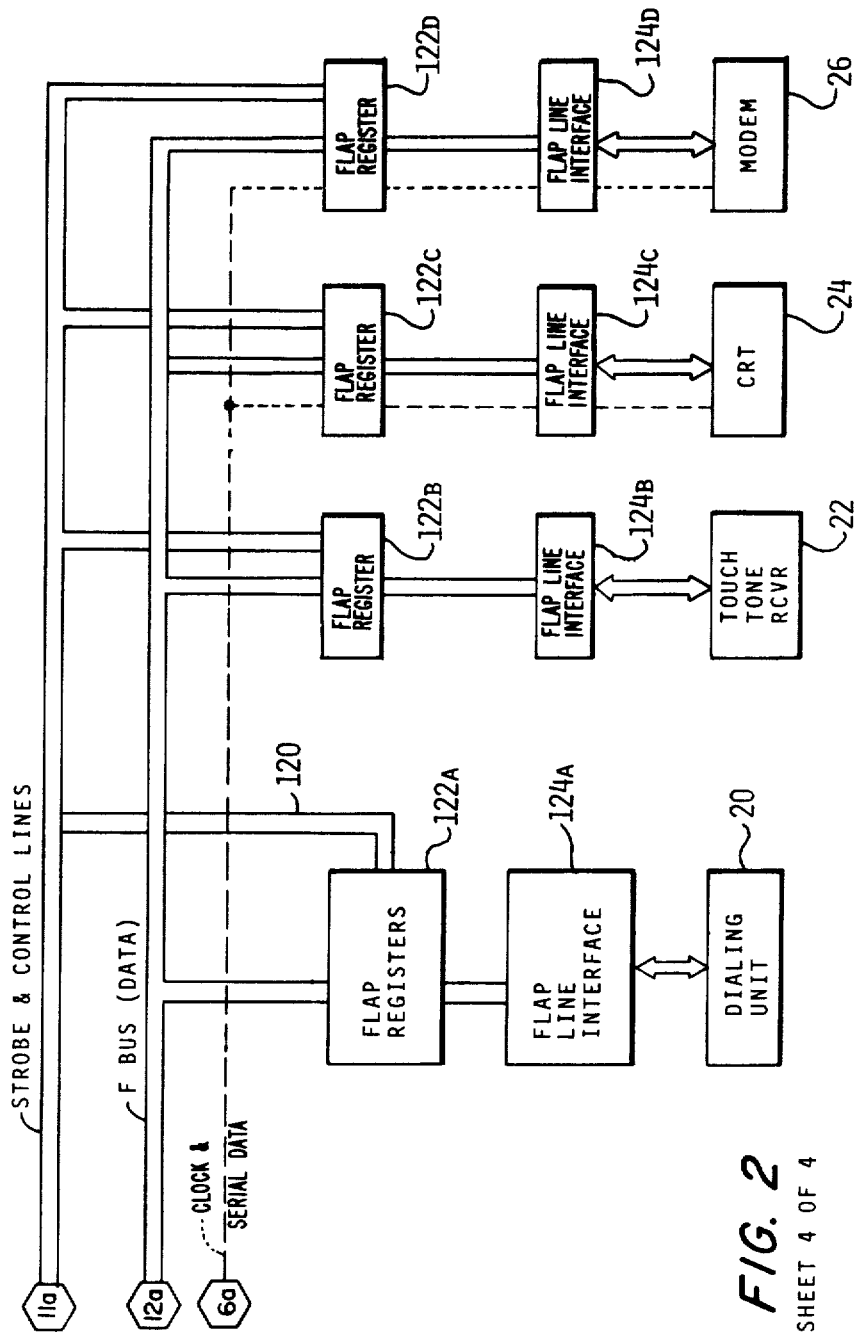

FIG. 2 shows a block diagram of the communications subsystem 1 including the communications controller 10 and the FLAPs 12, 14, 16 and 18. Information is received by communications controller 10 from main memory 6 via system bus 2, a transceiver 50, C bus 62, and is stored in an in-data register 56 under control of bus and status logic 60. Bus and status logic 60 is described in U.S. application Ser. No. 008,001 filed Jan. 31, 1979, now U.S. Pat. No. 4,293,908, entitled, "Data Processing System Having Direct Memory Access Bus Cycle." Information is transferred to the system bus 2 via a random access memory (RAM) 52, C bus 62 and transceiver 50.

Information may be routed from RAM 52 to in-data register 56 since transceiver 50 is capable of isolating the C bus 62 from system bus 2 during a wrap-around operation. RAM 52 contains four 16 bit registers, an interrupt data register 52a, an input/output data register 52b, a direct memory access (DMA) register 52c and a DMA address register 52d.

The interrupt data register 52a stores the channel number of the CPU 4 and the interrupt level of the information received by the communications subsystem 1 for the transfer to main memory 6.

The CPU 4 channel number on system bus 2 indicates that this system bus 2 cycle contains information for the CPU 4.

The input/output data register 52b stores information, status or device identification, in response to a CPU 4 input request. The DMA data register 52c stores the information that is to be written into main memory 6.

The DMA address register 52d stores the main memory 6 address location into which the information stored in DMA data register 52c is to be written. The DMA address register 52d may also store the main memory 6 address location of the information requested by communications controller 10.

A channel number register 58 receives the channel number of all system bus 2 input/output cycles. The bus status and control logic 60 compares the channel number stored in manual switches with the channel number present on the system bus 2. An equal comparison indicates that this system bus 2 cycle is addressing communications subsystem 1. The channel number register 58 is then used to store the channel number present on the system bus 2. A function code register 130 stores the function code received from the system bus 2. The function code indicates to the communications subsystem 1, the input/output function the communications controller 10 is to perform.

A microprocessor 96 controls the operation of the communications controller 10. The microprocessor 96 communicates with the system bus 2 via a U bus 82, a buffer transceiver 98, I bus 64, rRAM 52 for sending data to the system bus 2; and in data register 56 for receiving data from the system bus 2, and transceiver 50. Microprocessor 96 generates address signals which are sent over an address bus 100.

Also coupled to U bus 82 are universal synchronous receive/transmit receivers USRT2-88 and USRT3-90 communication interfaces. Associated with USRT-2 88 is a baud rate generator BAUD-2 68 and an LR2-2 register 66. Associated with USRT-3 90 is a baud rate generator BAUD-3 69 and an LR2-3 register 67. BAUD-2 68 and BAUD-3 69 receive signals from I bus 64 to specify the baud rate for the devices directly connected to communications subsystem 1, and also indicates to USRT-2 88 and USRT-3 90 respectively, the baud rate for transmission to an external device.

The LR2-2 register 66 and LR2-3 register 67 store signals from I bus 64 for controlling such operations as clear, idle link state, transmit-on, receive-on, and loop modes of USRT-2 88 and USRT-3 90 respectively.

An LR5 multiplexer 128 receives output status signals indicating transmit underrun, byte available, status available, idle link state from USRT-2 88 or USRT-3 90 for transfer to I bus 64.

Intercept data programmable read only memory (PROM) 70 is addressed by channel number signals selecting a particular communication channel in communications subsystem 1 and also addressed by signals indicating that the USRT-2 88 or the USRT-3 90 has generated a data service request. An intercept signal from PROM 70 is applied to intercept control logic 80. Microprocessor 96 queries intercept control logic 80 for the interrupt signal. Microprocessor 97 is responsive to the intercept signal to receive the remaining PROM 70 signals identifying the interrupting unit for processing the particular communication channel.

A channel register 74 is associated with the paging operation which is described infra. Channel register 74 is loaded by microprocessor 96 through U bus 82, transceiver 98, and I bus 64 with information indicating which communication channel is operative. Signals CPGCNL+00 and CPGCNH+00 are provided to the strobe generator and control register 102 for generating FLAP strobes and storing the direct connect, clear to send and protocol modes of operation.

A random access memory (RAM) 118 stores channel control programs (CCP), communication control blocks (CCB) and line control tables (LCT). This information is loaded into RAM 118 from main memory 6, via system bus 2, transceiver 50, C bus 62, in data register 58, I bus 64, transceiver 98, U bus 83, a transceiver 108, an M bus 110 to RAM 118. This is accomplished by microprocessor 96 generating appropriate address locations which are transferred to RAM 118 via address bus 100 and paging logic 116.

The communications controller 10 continually scans the communication lines from FLAPs 12, 14, 16 and 18 for any activity. Upon detection of a receive channel activity, the receive CCP for that channel is initiated. Under CCP control the communications controller 10 analyzes the assembled receive data byte, performs any required checks, updates the LCT status and CCB control progress, and delivers the data byte to main memory 6. The CCP terminates after each completed transfer to main memory 4, or when interrupted by a higher priority channel.

The CCB area of RAM 1218 provides information on each communication line in a transmit mode and each communication line in a receive mode. The information includes a main memory 6 address location of the next data byte to be stored or read. The information further includes a count of the number of bytes remaining for transfer between the communications controller 10 and main memory 6, and the final status of the communication line. The final status includes error information, data set status (e.g. modem 26), interrupt status, and whether the CCB program has been executed and the status is complete.

The LCT area of RAM 118 stores receive and transmit configuration, context and control information for each communication line. Included are firmware work locations, CCP work locations, receive transmit character length information, a CCP pointer, data byte storage, status information and interrupt level information.

A CCB active register 76 stores information indicating which of the four communication lines is active, and whether the communication line is in a receive or transmit mode. The output of the CCB active register 76 is available to the microprocessor 96 through the paging logic 116.

An S register 78 allows the microprocessor 96 to perform an indirect addressing function by storing an address in the S register 78. This address replaces an address stored in a PROM 126 address location.

PROM 126 stores the firmware routines which are operative with the microprocessor 96. Address information is sent from microprocessor 96 to PROM 126 via address bus 100 and paging logic 116. A microword read from PROM 126 is sent back to the microprocessor 96 via the M bus 110, transceiver 108 and U bus 82.

The microprocessor 96 communicates with the CPU 4 and the main memory 6 over system bus 2 as well as the USRT-2 88 and USRT-3 90 through the firmware routines stored in PROM 126 and the software channel program routines stored in RAM 118.

It is necessary to match the speed of microprocessor 96 with the speed of the logic and memory units. This is accomplished through a clock logic 94 unit. The microprocessor 96 normally runs at a 500 nanosecond or two megahertz clock rate. However, when the microprocessor 96 communicates with the USRT-2 88 and USRT-3 90 or FLAP 122a, 122b, 122c, or 122d logic, the clock logic 94 phase 1 and phase 2 timing signals are slowed to a 1600 nanosecond or 0.625 megahertz clock rate. The clock logic 94 outputs a number of clock phase signals in each microprocessor 96 phase 1 and phase 2 cycles. The phase 1 and phase 2 cycles are stretched to enable additional clock phase signals to control the FLAP 122a–d logic.

When USRT-2 88 is in a transmit (bit oriented protocol) mode, and the next data byte is not provided to the USRT-2 88 in time to provide a continuous stream of bits to the receiving station, then a transmit underrun unit 92 conditions the USRT-2 88 to transmit a series of binary ONEs indicating to the receiving station that the message was aborted. The data bytes are sent to a device via serial FLAP interface logic 106 and a FLAP line interface 124c and 124d.

An idle link state unit 93 is also coupled to the USRT-2 88. When the USRT-2 88 is in a receive (bit oriented protocol) mode, the sending station places the line in an idle state by sending 15 binary ONE bits on the line. The idle link state unit 93 detects the 15 binary ONE bits and informs the microprocessor 96 that the line is in an idle link state via LR5 MUX 128. The microprocessor 96 responds to the 15 successive binary ONE bits to abort the message sent by the sending station and look for a new message.

A transmit underrun unit 85 and an idle link state unit 86 are coupled to USRT-3 90 to perform the transmit underrun operation and receive idle link state operation for that communication channel.

An address decode 114 unit receives address signals from the microprocessor 96 via address bus 100 and generates control signals which perform a number of functions, typically activating the stretch cycle of clock logic 94, enabling certain registers to store information from the various buses, enabling a strobe generator and control register logic 102 by means of signal CPGFLP-00, and enabling USRT-2 88 and USRT-3 90.

The strobe generator and control register logic 102 is responsive to address signals received over address bus 100 for generating separate strobe signals for FLAP registers 112a, 122b, 122c and 122d as well as control signals which are enabled at the respective FLAP registers 122a–d by the particular strobe signal. Stored are bits indicating the direct connect, clear to send and protocol modes of operation.

An external connector 84 is provided for testing purposes. It allows test equipment to be connected to U bus 82 to exercise the communications controller 10 through firmware test routines applied externally. PROM 126 may be disabled for certain test sequences.

A paging logic 116 unit in conjunction with the channel register 74 and the CCB active register 76 allows the microprocessor 96 to be operative with the eight communication channels using a single firmware set of routines. Associated with each communication channel is a block of CCB software. The paging logic allows the same set of firmware routines to process each CCB program. Similarly, the LCTs are organized by communication line. The paging logic 116 allows a single firmware routine to be operative with each communication line.

Data is transferred between the U bus 82 and the FLAPS 122a–d via F bus 112 and a transceiver 104.

The FLAP registers 122a–d are operative with the FLAP line interface receivers and drivers 124a, 124b, 124c and 124d for communication with devices 20, 22, 24 and 26 respectively.

Figure 3:
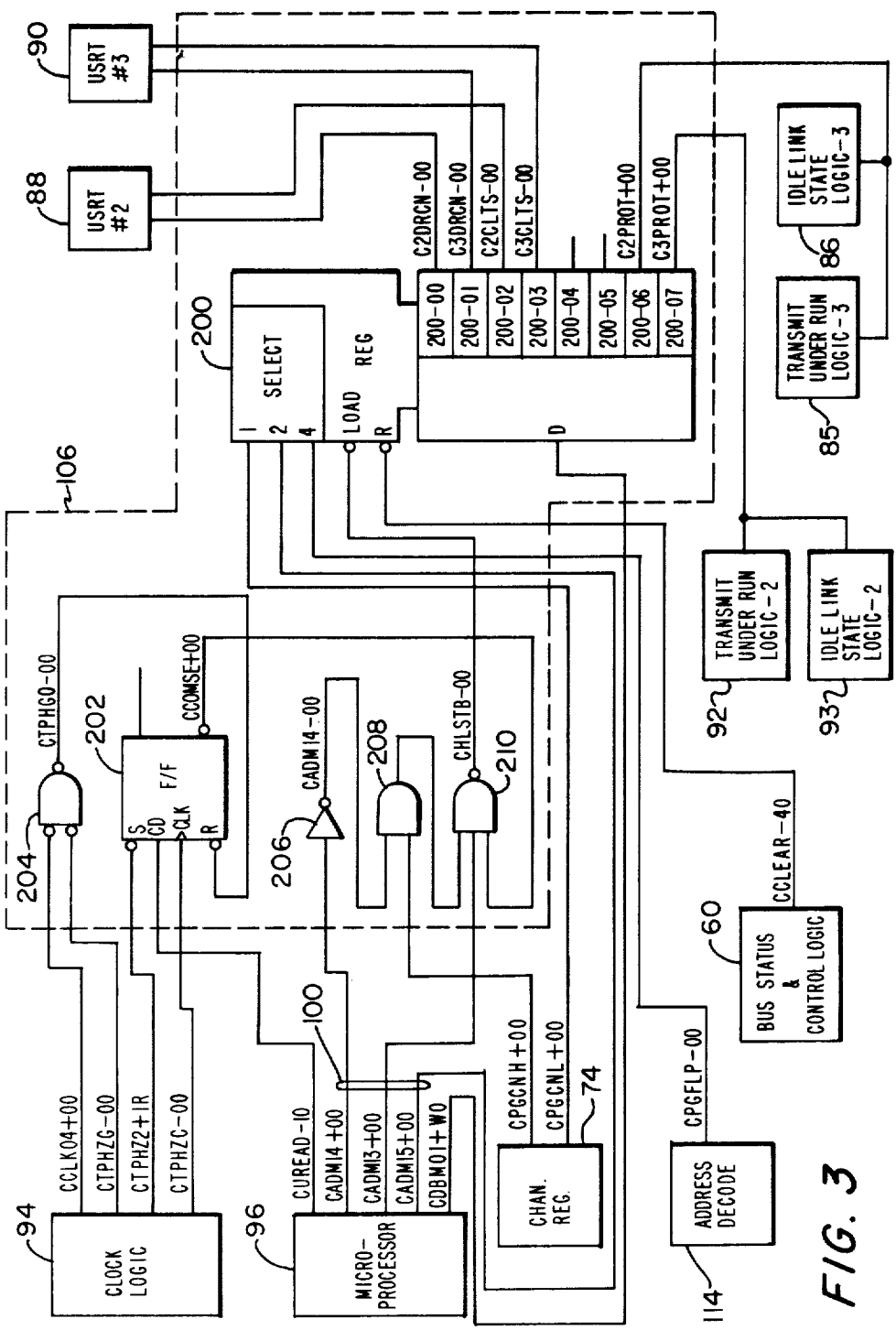
FIG. 3 is a logic diagram of a portion of the strobe generator and control register 102 showing the data monitor latch.

Referring to FIG. 3, an addressable data monitoring latch 200 stores control information received from the U bus 82, FIG. 2, via data signal CDBM01+W0. Latch 200 includes 8 one bit addressable registers.

Signals applied to the select terminals of latch 200 select one of 8 registers. Registers 200-00 and 200-01 storage binary ZERO bits to indicate when the devices associated with USRT-2 88 and USRT-3 90 respectively are in direct connect transmitting or receiving mode of operation. Registers 200-02 and 200-03 store binary ZERO bits to indicate that the device associated with USRT-2 88 and USRT-3 90 are in a clear to send mode to receive information from the USRT.

Registers 200-06 and 200-07 store binary bits to indicate that the communication lines associated with USRT-2 88 and USRT-3 90 respectively transmit and receive information in a bit oriented protocol or a byte control protocol.

In the direct connect mode, the clock generated in the communications controller 10 controls the USRT and device timing. The microprocessor 96 initiates the data signal CDBM01-W0 during a write cycle, that is the microprocessor 96 read/write signal CUREAD-10 is at logical ONE.

The clear to send response from the device to the request to send by the communications controller 10 appears on U bus 82 during a read cycle, that is read/write signal CUREAD-10 is at logical zero.

Signal CPGCNL+00 stored in channel register 74 is applied to select terminal 1 of latch 200 and selects a latch 200 register associated with USRT-2 88 or USRT-3 90. Signal CPGFLP-00 is generated by the address decode logic 114 and is applied to select terminal 4 of latch 200. The least significant address signal CADM15+00 is applied via address bus 100 from microprocessor 96 to select terminal 2 of latch 200. Signal CPGFLP-00 selects the protocol signals C2PR0T+00 and C3PR0T+00 in conjunction with address signal CADM15+00 and signal CPGCNL+00. The function of signals CPGFLP-00, CPGCNL+00 and CPGCNH+00 are further described in copending related U.S. application Ser. No. 194,540 entitled "A Microprocessor Controlled Communications Controller Having a Stretched Clock Cycle." The address signal CADM15+00 selects, with signal CPGCNL+00, the clear to send signals C2CLTS-00 and C3CLTS-00. The signal CPGCNL+00 selects the direct connect signals C2DRCN-00 and C3DRCN-00.

The output of a NAND gate 210, strobe signal CHLSTB-00 at logical ZERO is applied to a LOAD terminal of latch 200 to load the data bit signal CDBM01+650 into the selected register of latch 200. The timing of strobe signal CHLSTB-06 is controlled by a flop 202 output signal CCOMSE+00, applied to NAND gate 210. The strobe signal CHLSTB-00 is conditioned by means of address signal CADM13+00, address signal CADM14+00 applied through an inverter 206 and an AND gate 208, and channel register 74 signal CPGCNH+00 applied through AND gate 208 to the input of NAND gate 210.

Latch 200 is set to a known state during a general clear operation from bus status and control logic 60 by signal CCLEAR-40.

The direct connect signal C2DRCN-00 at logical ZERO indicates to the communications subsystem 1 that the baud generator-2 68 will supply the clock signal to the USRT-2 88 and to the devices directly connected to the communication channel associated with the USRT-2 88. Similarly, direct connect signal C3DRCN+00 at logical ZERO indicates that the baud generator-3 69 will supply the clock signal to the USRT-3 90 and to the devices directly connected to the communication channel associated with USRT-3 90. The direct connect clock operation is disclosed in copending related U.S. application Ser. No. 194,310 entitled, "A Communication Subsystem Having a Direct Connect Clock".

The clear to send signals C2CLTS-00 and C3CLTS-00 indicates to the respective USRT-2 88 and USRT-3 90 that the device connected to the communication channels associated with USRT-2 88 and USRT-3 90 is ready to receive data from the communications controller 10. The intercept data PROM 70, FIG. 2, is responsive to the clear to send signals C2CLTS-00 and C3CLTS-00 via USRT-2 88 and USRT-3 90 respectively to send signals to the microprocessor 96 to process the communication channel requesting service. This is described in U.S. application Ser. No. 000,477, now U.S. Pat. No. 4,271,467, entitled "I/O Priority Resolver" which is incorporated by reference.

The protocol signal C2PROT+00 is applied to the transmit underrun logic −2 92 and the idle link state logic −2 93 associated with USRT-2 88. Protocol signal C3PROT+00 is applied to the transmit underrun logic −3 85 and the idle link state logic −3 86. The protocol signals indicate the data transmission mode of operation, bit oriented protocol or byte control protocol. The function of the protocol signals are described in copending related U.S. applications Ser. No. 194,698 entitled, "A Communication Subsystem Idle Link State Detector" and Ser. No. 194,655 entitled, "A Communications Subsystem With an Automatic Abort Upon Transmit Underrun."

Figure 4:
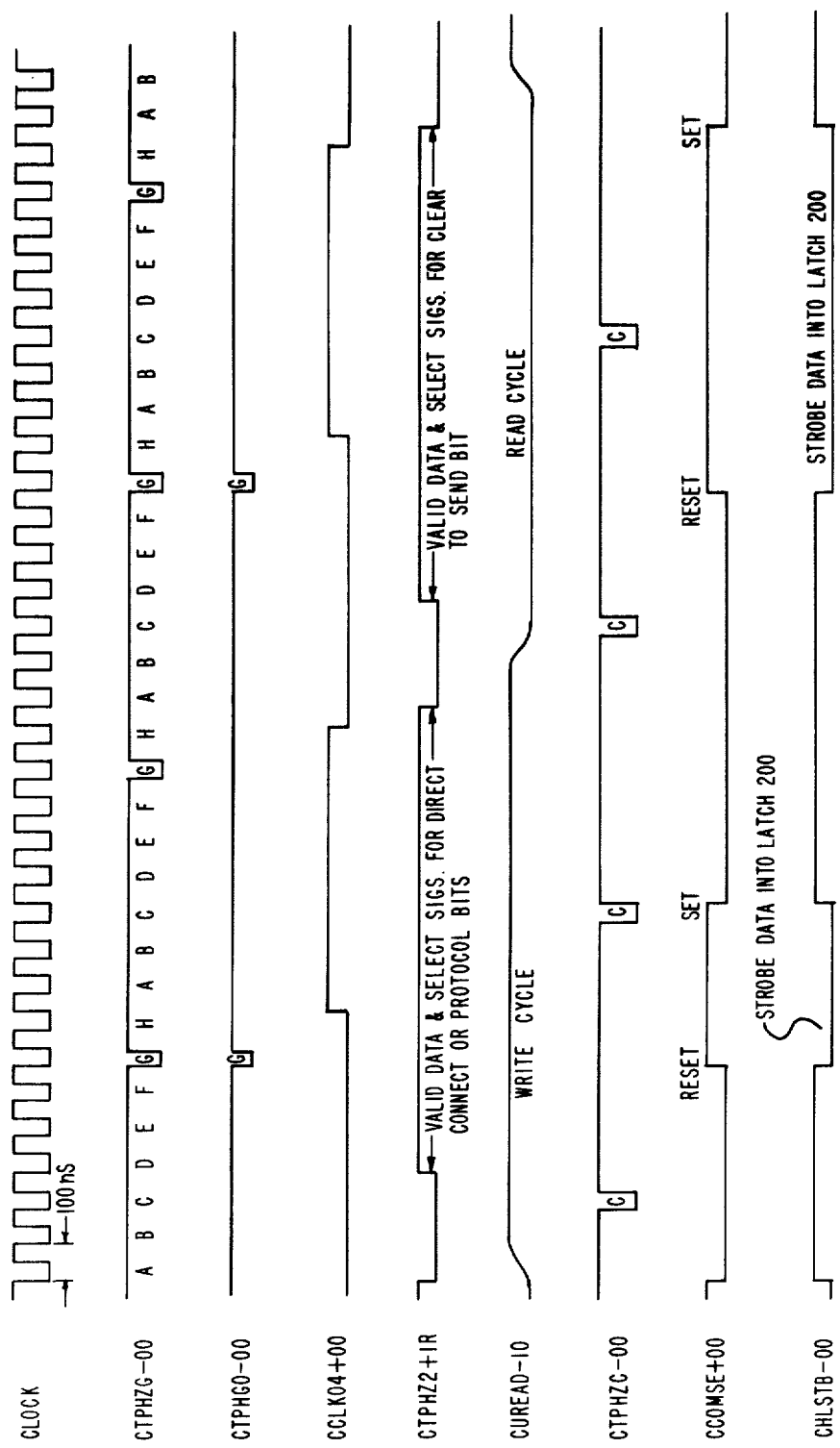
FIG. 4 is a timing diagram of the data monitor latch operation.

FIG. 4 shows a timing diagram of the latching operation. The basic clock timing is a 100 nanosecond square wave which is used to generate timing signals CTPHZG-00, CCLK04+00, CTPHZ2+1R and CTPHZC-00 in clock logic 94. These signals are described in copending related U.S. application Ser. No. 194,540 entitled, "A Microprocessor Controlled Communications Controller Having A Stretched Clock Cycle".

During a write cycle, when read/write signal CUREAD-10 is high, flop 202 is reset at "G" time when both clock signals, CTPHZG-00 and CCLK04+00, applied to an AND gate 204 are low (see FIG. 3). Reset signal CTPHG0-00, the output of AND gate 204, low, resets flop 202, setting output indicate that a byte is stored in USRT-2 88, a binary RXDA+ is at logical ONE; 15 successive binary ONEs were received by USRT-2 88, signal RILS+00 is at logical ONE; the byte stored in USRT-2 88 indicates a change in status; or there was a transmit underrun, signal TURQ is at logical ONE.

A transmit underrun condition results when data is not supplied to the USRT in time to provide for synchronous transmission. The transmit underrun operation is described in co-pending related U.S. application Ser. No. 194,655, entitled, "A Communications Subsystem With An Automatic Abort Upon Transmit Underrun."

The microprocessor 96 resets the counter 310 by loading a binary ZERO bit in register 66 via I bus 64 and clock signal CE212D- to force reset signal RILS-OR to logical ZERO. Signal RILS-OR, at logical ZERO, applied to a NOR gate 308 resets counter 310 via signal RILS-IR. Note that counter 310 is also reset and USRT-2 88 receive logic is disabled by signal RXON+ at logical ZERO.

The microprocessor 96 is a Motorola 6800 circuit described in "Basic Microprocessors and the 6800" by Ron Bishop, published by Hayden Book Co., Inc., of Rochelle Park, N.J. The USRT-2 88 is a Signetics 2652 Multi-Protocol Communications circuit described in "Signetics Bipolar/MOS Microprocessor Data Manual," copyright 1977 by Signetics Corp., 811 E. Arques Ave., Sunnyvale, Calif. 94080. Counter 310 is a 74LS161 circuit, MUX 128 is a 74LS194 circuit, and register 66 is a 74LS273 circuit described in "The TTL Data Book for Design Engineers," Second Edition, 1976, published by Texas Instruments Inc.

Having shown and described a preferred embodiment of the invention, those skilled in the art will realize that many variations and modifications may be made to effect the described invention and still be within the scope of the claimed invention. Thus, m any of the elements will provide the same results and fall within the spirit of the claimed invention. It is the intention, therefore, to limit the invention only as indicated by the scope of the claims.

What is claimed is:

1. In combination with a plurality of communication lines and a data processing system comprising a system bus, at least one central processing unit (CPU), one main memory, one peripheral controller and a communication subsystem, each individually coupled to said system bus, said communication subsystem including a communications controller and further including a modem, a dialing unit, a touch tone receiver, and a cathode ray tube display (CRT), each coupled to said communications controller, said modem, said dialing unit, and said touch tone receiver also coupled to said communication lines, said communications controller comprising:
   (a) an address bus;
   (b) a data bus;
   (c) a microprocessor coupled to said address bus and data bus;
   (d) universal synchronous receive transmit (USRT) means coupled to said data bus for transmitting data to and receiving data from said typical communication devices;
   (e) baud rate generation means coupled to said data bus and said USRT for specifying the baud rate for transmission of said data for each of said typical communication devices directly connected to said communication subsystem and to indicate to said USRT the baud rate for transmission of said data to each of said typical communication devices which are external to said communication subsystem;
   (f) latching register means also coupled to said address bus, said microprocessor, said USRT means and said data bus for storing a plurality of signals received from said microprocessor and generating a direct connect mode signal, a clear to send signal and a bit oriented protocol (BOP) mode signal;

said USRT means being responsive to said direct connect mode signal for selecting a baud rate signal from said baud rate generation means for establishing the transmission rate of said data for said each of said typical communication devices directly connected to said communication subsystem;

said USRT means being responsive to said clear to send mode signal for transmitting said data to a selected one of said typical communication devices; and said USRT means being responsive to said BOP mode signal for establishing said data transmission between said USRT and said selected one of said typical communication devices in a BOP mode.

2. The communications controller as recited in claim 1 wherein said latching register means includes first register means for storing said direct connect mode signal.

3. The communications controller as recited in claim 2 wherein said latching register means includes second register means for storing said clear to send mode signal.

4. The communications controller as recited in claim 3 wherein said latching register means includes third register means for storing said BOP mode signal.

5. The communications controller as recited in claim 4 wherein said latching register means includes load register means for loading said latching register means with said direct connect mode signal and said clear to send mode signal and further including clock logic means coupled to said load register means for generating clock timing signals to said latching register means.

6. The communications controller as recited in claim 5 wherein said latching register means includes flip-flop means coupled to said clock logic and responsive to said microprocessor for loading data from said data bus into the latching register means.

* * * * *